Patented Aug. 14, 1945

2,382,586

UNITED STATES PATENT OFFICE 2,382,586

METAL HALIDE CATALYSTS

Ernest Solomon, Nutley, Herbert J. Passino, Jersey City, and Louis C. Rubin, West Caldwell, N. J., assignors to The M. W. Kellogg Company, Jersey City, N. J., a corporation of Delaware No Drawing. Application September 30, 1941, Serial No. 413,038

3 Claims. (Cl. 252—217.3)

This invention relates to improved catalytic material comprising carbon black in combination with suitable halide catalysts and methods for the production of such improved catalysts. More particularly, the invention relates to an improved aluminum halide catalyst comprising carbon black as a supporting material therefor. Still more particularly, the invention relates to the production of an improved catalyst comprising aluminum chloride in combination with carbon black.

The catalysts of the present invention comprise carbon black in combination with suitable metal halides or mixtures of metal halides with hydrogen halides. For example, the halides of aluminum, zirconium, tantalum, iron and tin may be employed. The halides of aluminum such as aluminum bromide and aluminum chloride are particularly useful in connection with this invention because of their relative cheapness and catalytic activity. In the further description of the invention specific reference will be made to anhydrous aluminum chloride. The invention includes within its scope, however, the use of other halides of aluminum such as aluminum bromide and as well other catalytically active metal halides.

Aluminum chloride is a highly active catalyst for many organic reactions, particularly reactions of hydrocarbons such as isomerization, alkylation and polymerization. However, it is preferred to employ aluminum chloride in combination with other relatively inactive materials which may be said to serve as supports for the aluminum chloride. The use of supporting materials in connection with aluminum chloride isomerization catalysts is desirable because of the relatively high vapor pressure of the aluminum chloride at the reaction temperature, which causes the catalyst to be carried from the reaction zone in the stream of reactants. A second reason for the desirability of a supporting material is the occurrence of side reactions of the hydrocarbons with the aluminum chloride. Products of such side reactions are adsorbed by the supporting material and are thus prevented from contaminating the catalyst or the product. A third reason for the desirability of supporting material for aluminum chloride catalysts is the relatively large surface which is presented to the reactants by spreading the aluminum chloride throughout a larger catalytic mass.

We have found that carbon black is a highly valuable ingredient for metal halide catalysts. Carbon black employed in this invention in combination with a metal halide catalyst such as aluminum chloride may be any form of the material commonly referred to as carbon black, gas black, ebony black, jet black, satin gloss black, etc. Such materials are produced by the thermal decomposition, as by incomplete combustion, of a hydrocarbon gas. The carbon black employed in the process of this invention also may include materials produced by the decomposition of other hydrocarbons such as light hydrocarbon oils if the material thus produced either as such or after suitable treatment approximates gas black in physical properties and purity, particularly in freedom from hydrocarbons. In general, the term includes any carbonaceous material, having the essential properties of carbon black and produced by the thermal decomposition of hydrocarbons, which is sufficiently free from residual materials which are deleterious to the metal halide catalyst. As used in this description of the invention the term "carbon black" is intended to refer to carbonaceous materials thus defined and to distinguish the carbonaceous material employed in the present invention from other forms of carbon such as essentially residual materials like wood char and coke which have been treated, for example, by leaching, for the removal of adsorbed materials therefrom.

The carbon black may be combined with the aluminum chloride, or other suitable halide catalyst, as a mere physical mixture or, before use, the aluminum chloride and carbon black may be treated to effect adsorption of the former by the latter. It is sufficient, however, to charge the aluminum chloride and carbon black to the catalytic reaction zone as a simple mixture, or alternate quantities of the aluminum chloride and carbon black may be charged to the reactor to form therein alternate, relatively thin layers of the catalyst and supporting material. It is satisfactory to charge the catalytic material to the reactor as a simple mixture of ingredients since the aluminum chloride functions satisfactorily as a catalyst in that form, and such portions thereof as are vaporized by the passage of hot reactants thereover are adsorbed by the carbon black and retained in use in the reactor. Apparently, during reactions such as hydrocarbon isomerization, vaporization and adsorption of the aluminum chloride in this manner proceed during the conversion treatment until substantially all aluminum chloride charged to the reactor has been adsorbed by the carbon black. This results in substantial shrinkage of the body of catalytic material in the reactor during the operation.

In whatever form or manner the catalytic material is charged to the reactor for use under conditions which promote evolution of the aluminum chloride it is desirable to include in the reactor, at the end thereof adjacent the exit for the reaction mixture, a substantial layer of carbon black having a relatively high adsorptive capacity for aluminum chloride. For example, this portion of the reactor may be charged with carbon black substantially free from aluminum chloride. Thereafter during the conversion treatment aluminum chloride evolved elsewhere in the reactor, and not adsorbed from the reaction mixture prior to passage of the latter through the portion of the reactor adjacent the exit, is adsorbed by the layer of carbon black in that portion of the reactor and thus retained in the reactor and in effective use.

The relative proportions of carbon black and halide catalyst to be employed depend upon the character of the latter and the reaction conditions. In general any suitable ratio of halide catalyst to carbon black is employed which is sufficient to effect the desired conversion reaction at the operating conditions selected. In general, it is desirable to employ as large a ratio of halide catalyst to carbon black which does not result in substantial loss of halide catalyst from the reactor by vaporization thereof.

With aluminum chloride it is feasible to employ satisfactorily ratios of the catalyst to carbon black as high as 1:1 without loss of aluminum chloride and when operating at the relatively high temperatures employed to effect isomerization of hydrocarbons.

The aluminum chloride and carbon black may be employed in any particle size. To assist in obtaining uniform mixing of the ingredients of the catalytic mass when they are charged to a reactor as a simple mixture it is desirable generally that they have particle sizes of the same order of magnitude. When the catalytic material is employed as a stationary mass through which fluid reactants are passed as a stream it may be desirable to employ the aluminum chloride and carbon black in substantial particle sizes in order to restrict the pressure drop on the stream of reactants through the catalyst bed. Furthermore, adsorption of aluminum chloride by the carbon black during the conversion treatment results in substantial shrinkage of the catalyst mass during the reaction. The employment of the catalyst mass in substantial particle size minimizes the variation in pressure drop through the catalyst bed during the reaction as a result of such shrinkage.

Since carbon black ordinarily is produced in a finely divided form it is desirable to convert it to a granular form prior to use. The size of the granules necessarily is dependent upon various conditions such as the pressure drop desired in the reactor, the granule size of aluminum chloride, etc. It has been found, however, that formation of the carbon black into granules of a size which will pass through a 4 mesh screen and be retained on an 8 mesh screen and the use of aluminum chloride of a similar granule size is satisfactory for use of the catalytic material in stationary catalyst masses of moderate size.

Formation of the finely divided carbon black into granules of larger size may be effected by any suitable means as by pelleting or by extrusion. In the formation of such relatively large granules it is desirable to add certain materials to the carbon black which assist in pelleting or extrusion or serve as binders in the finished granules. Such materials generally include inorganic compounds which are non-reactive with the halide catalyst or hydrocarbon reactants or other carbonaceous materials which are free from residues deleterious to the halide catalyst.

Inorganic materials suitable for use in granulating the carbon black include, in general, clays, various forms of silica, materials of like physical characteristics such as magnesium silicate, as in the form of asbestos flour. Clays which may be employed in the invention include natural clays such as Attapulgus clay and treated clays such as that marketed under the trade name "Super-Filtrol." Among the clays, however, it is found that bentonites as a group are superior to other forms for the purpose of the invention, apparently because of their tendency to contract on drying. A bentonite which has been found satisfactory for the purposes of the invention is a variety thereof marketed under the trade name "Volclay." In addition to clays silica gel and alumina gel also are suitable for the purpose.

Other carbonaceous materials satisfactory for use in combination with the carbon black are various tars which are capable of carbonizing without leaving residues deleterious to the halide catalyst, graphite, coke, and carbohydrates, such as sugar, capable of decomposing to leave a relatively pure carbonaceous residue.

While the list of materials suitable for use in combination with a carbon black is rather extensive, it is to be understood that the invention is not limited to the use of any particular material in combination with carbon black, as the latter may be employed alone or in combination with any material which is satisfactory to assist in the granulation of the carbon black and is not deleterious to the halide catalyst or hydrocarbon reactants.

The proportions of carbon black and the additional material, hereinafter referred to as "binders," to be employed in the granulation of the carbon black depends somewhat upon the character of the binder and the size and strength desired in the carbon black granules. It is unnecessary, however, to employ binders in such proportions as to substantially alter the essential character of the carbon black. For example, with bentonites such as "Volclay" it is unnecessary to employ the binder in quantities greater than 20 to 25 per cent of the mixture of carbon black in the binder to form granules of substantial strength. 15 per cent of the "Volclay" is apparently satisfactory for all purposes, and under circumstances permitting the use of granules of lesser strength substantially smaller proportions of binder may be employed. For example, it may be desirable to employ quantities as low as 3 to 5 weight per cent of the total quantity of carbon black and binder. In general it is to be understood that the proportion of binder employed is not critical in the invention, and it is unnecessary to employ the binders in larger proportions than necessary to effect satisfactory granulation of the carbon black.

As indicated above, the catalyst of the invention conveniently may be formed as a simple mixture of aluminum chloride and carbon black, each ingredient preferably being present in the form of granules of substantial size. However, the catalyst may also be prepared in the form of carbon black particles containing adsorbed aluminum chloride. The catalyst in this form is prepared by any suitable handling of the materials which effects vaporization of the aluminum chloride and adsorption of the vapors by the carbon black. The carbon black may be treated in its natural form to effect adsorption of the aluminum chloride thereon, or the carbon black preferably is formed into pellets and thereafter contacted with vaporized aluminum chloride to effect the desired adsorption. The carbon black and aluminum chloride may be mixed and heated under pressure to effect the desired vaporization and adsorption of the aluminum chloride, or aluminum chloride vapors may be passed into a body of aluminum chloride to effect the desired adsorption.

The invention will be described further in connection with specific examples of the preparation of the catalytic material of the present invention from carbon black, granulated with "Volclay" as a binder, and aluminum chloride. It is to be understood, however, that the references to the use of "Volclay" as a binder in the granulation of the carbon black represent merely the use of bentonites in particular and clays in general. It is to be understood, furthermore, that the reference to a particular clay in the following examples is not intended to limit the invention to the use of any particular binder with the carbon black.

*Example I*

4 parts by weight of carbon black and 1 part by weight of "Volclay" were mixed in the presence of sufficient water to form an extrudable mixture. The resulting mixture was extruded into rods approximately ¼ inch in diameter, and the rods thus obtained were dried at 300° F. The dried rods were then crushed to form a granular mixture from which granules passing a 4 mesh screen but retained by an 8 mesh screen are separated for use. The granular supporting material thus produced was mixed with an equal part by weight of anhydrous aluminum chloride of the same granule size, and the resulting physical mixture was charged to a suitable reactor. A feed consisting of 90 per cent normal butane and 10 per cent hydrogen chloride was passed through the reactor under a pressure of 600 pounds per square inch at a space velocity of .4 to .45 volumes of normal butane (liquid basis) per volume of catalyst space per hour (or .15 to .2 gallons of normal butane per hour per pound of aluminum chloride). The temperature in the reactor was raised gradually to 150° F. at which point the hydrocarbon product contained 33 to 35 weight per cent of isobutane. Thereafter the operating temperature was increased periodically to a maximum temperature of 250° F. During this operating run isobutane was produced in an amount equal to over 17 gallons per pound of aluminum chloride employed.

*Example II*

Carbon black was granulated in accordance with the general procedure of Example I except that the extruded rods were dried at 500° F. The granulated carbon black thus prepared was mixed with aluminum chloride of the same mesh size but in a ratio of 3 parts of supporting material to 2 parts of aluminum chloride. A feed consisting of 90 per cent normal butane and 10 per cent hydrogen chloride was passed through the reactor under a pressure of 600 pounds per square inch at a space velocity of .4 to .45 volumes of normal butane (liquid basis) per volume of catalyst space (or .17 to .22 gallons of normal butane per pound of aluminum chloride per hour). The reaction temperature was increased gradually to 130° F. at which condition the hydrocarbon reaction product contained 20 to 22 weight per cent of isobutane. After 18 hours' operation of the reactor at 130° F., at which time the operation had produced approximately 2.25 gallons of isobutane per pound of aluminum chloride charged to the reactor, a second reactor similar in the quantity and quality of catalytic material employed to the first reactor was introduced into the system, and the total product of the first reactor was charged directly to the second reaction. The temperature of the second reactor was increased gradually to 130° F. at which time the hydrocarbon product issuing from the second reactor contained approximately 35 weight per cent of isobutane. The operation was continued thereafter with both reactors at a temperature of 130° F. In this condition the operation became substantially stabilized with the product of the first reactor containing 20 to 24 weight per cent of isobutane and the final product emerging from the second reactor containing 33 to 35 weight per cent of isobutane. After a considerable period of operation under these substantially stabilized conditions the activity of the first reactor declined to the point where the product of the first reactor contained no more than 10 weight per cent of isobutane. At the same time, however, the second reactor, operating on a feed increasingly concentrated in normal butane, effected a relatively greater production of isobutane whereby the final product issuing from the second reactor contained 33 to 35 weight per cent of isobutane. After the first reactor declined in activity to the point whereby the product thereof contained less than 10 per cent of isobutane it was continued in use for a short time during which an attempt was made to maintain or increase activity by increasing the temperature relatively rapidly to a final temperature of 160° F. This reactor was removed from the operation at the end of 1470 hours of use at which time it had produced 42 gallons of isobutane per pound of aluminum chloride charged to that reactor. At that time there had been produced in the second reactor (that is, after 1368 hours of use of this reactor) a total of 33 gallons of isobutane per pound of aluminum chloride charged thereto. After removal of the first reactor the operation was continued with the second reactor alone. In the operation employing the second reactor alone the product contained approximately 25 weight per cent of isobutane. At the end of 1475 hours' operation of the second reactor it had produced a total of 38 gallons of isobutane per pound of aluminum chloride charged thereto and exhibited no loss in activity.

We claim:

1. Catalytic material for promoting hydrocarbon isomerization comprising a non-gaseous catalytic metal halide in combination with base material comprising a plurality of preformed firm granules each consisting essentially of at least 75% of finely divided carbon black intimately mixed with a minor proportion of a finely divided bentonite binder.

2. Catalytic material for promoting hydrocarbon isomerization comprising a non-gaseous catalytic metal halide in combination with base material comprising a plurality of preformed firm granules each consisting of approximately 85% of finely divided carbon black intimately mixed with a minor proportion of a finely divided bentonite binder.

3. Catalytic material comprising anhydrous aluminum chloride adsorbed on a base material comprising a plurality of preformed firm granules each consisting essentially of at least 75% of finely divided carbon black intimately mixed with a minor proportion of a finely divided bentonite binder.

ERNEST SOLOMON.
HERBERT J. PASSINO.
LOUIS C. RUBIN.